United States Patent

Ando et al.

[11] Patent Number: 4,684,797
[45] Date of Patent: Aug. 4, 1987

[54] OPTICAL SYSTEM AND METHOD FOR REDUCING VIBRATION OF AN OBJECTIVE LENS IN AN OPTICAL HEAD ASSEMBLY OF AN OPTICAL READ/WRITE SYSTEM

[75] Inventors: Hideo Ando; Akihiko Doi, both of Tokyo, Japan

[73] Assignee: Kabushiki Kaisha Toshiba, Kawasaki, Japan

[21] Appl. No.: 705,306

[22] Filed: Feb. 25, 1985

[30] Foreign Application Priority Data

Feb. 29, 1984 [JP] Japan .................. 59-37548
Jan. 14, 1985 [JP] Japan ................... 60-4397

[51] Int. Cl.[4] ................................ G01J 1/20
[52] U.S. Cl. ........................ 250/201; 369/44
[58] Field of Search ............ 250/201, 204, 202; 369/44, 45, 46

[56] References Cited

U.S. PATENT DOCUMENTS

| | | | |
|---|---|---|---|
| 3,876,841 | 4/1975 | Kramer | 250/201 |
| 3,969,576 | 7/1976 | Boonstra et al. | 250/201 |
| 4,005,260 | 1/1977 | Janssen | 369/44 |
| 4,079,248 | 3/1978 | Lehureau et al. | 250/204 |
| 4,330,880 | 5/1982 | Van Dijk | 369/44 |
| 4,454,415 | 6/1984 | Nayak et al. | 250/201 |

*Primary Examiner*—David C. Nelms
*Attorney, Agent, or Firm*—Cushman, Darby & Cushman

[57] ABSTRACT

In an optical system, a laser beam emitted from a laser unit is converted by a collimator lens into a parallel light beam, and converged by an objective lens to a light reflecting surface of an optical disk having a tracking guide. The objective lens is suspended in a lens barrel assembly by a spring member so as to be moved by a voice coil along the optical axis of the objective lens for focus and by a linear motor in a direction perpendicular to the optical axis for tracking control. As a result, as the lens barrel assembly is moved along the optical disk, the objective lens is moved in a direction perpendicular to the optical axis of the system. Then, part of the light beam transferred from the objective lens is directed to any one of the first and second photosensitive sections of the photodetector. As a result, as the linear motor is driven in response to the difference of the signals from the first and second photosensitive sections, the vibration of the objective lens can be stopped.

22 Claims, 9 Drawing Figures

OPTICAL SYSTEM AND METHOD FOR REDUCING VIBRATION OF AN OBJECTIVE LENS IN AN OPTICAL HEAD ASSEMBLY OF AN OPTICAL READ/WRITE SYSTEM

BACKGROUND OF THE INVENTION

The present invention relates to a system and method for recording and reproducing or recording, reproducing and erasing information on an information recording medium such as an optical disk using a light beam and, more particularly, to an optical system for detecting a position of an objective lens in an optical head when an optical head for focusing a light beam on a light reflecting surface of an optical disk is skipped on the optical disk to trace a desired tracking guide using a light beam, thereby preventing the objective lens from vibrating.

In an information recording medium such as an optical disk, information is recorded on a light reflecting surface of a tracking guide extending concentrically or spirally along the circumference of the disk by changing the condition of the light reflecting surface, for example forming pits on the light reflecting space. This recording of information includes preinformation such as a tracking address and a sector address recorded in advance and data information such as an image to be recorded later, and the data information is recorded or reproduced while reading out the preinformation. Further, an objective lens is in general suspended by a leaf spring movable along the optical axial direction and to the direction perpendicular to the optical axis for the control of the focus and the tracking.

When information is reproduced or recorded from a desired tracking guide by skipping from a predetermined position in such an optical head, the optical head is moved at a relatively high speed along the radial direction of the optical disk, for example, by a linear actuator. However, there arises a problem that, when the optical head is moved at a high speed, an objective lens vibrates in the head and, even if the lens is located at a position of a desired tracking guide, the lens continues vibrating so that information cannot be immediately recorded or reproduced.

SUMMARY OF THE INVENTION

It is an object of the present invention to provide an optical system and method for optically detecting a position of an objective lens in an optical head.

It is another object of the present invention to provide a system and method for optically detecting a position of an objective lens in an optical head to stop a vibration of the lens when the lens vibrates in the head.

According to the present invention, there is provided an optical system and method in which, a light beam is focused onto a light reflecting surface. A light source generates a light beam which is collimated and directed to an objective lens having an optical axis. The collimated light beam is converged by the objective lens onto the light reflecting surface where it is reflected from the light reflective surface and transferred back through the objective lens. Means for supporting said objective lens allow it to move in a direction along the optical axis of the lens and in a direction perpendicular thereto. Means for finely moving said objective lens move it along the optical axis of said objective lens and in the direction perpendicular to the optical axis. Photodetecting means having at least first and second photosensitive sections detect the transferred light beam and direct part of the light beam transferred from said objective lens toward any of the first and second photosensitive sections when moving said objective lens in the direction perpendicular to the optical axis. Means are also provided for moving the head assembly (including said objective lens, said means for supporting said objective lens, said means for finely moving said objective lens and said photodetecting means) along the light reflecting surface in a predetermined direction to read or write data on the optical storage medium.

DETAILED DESCRIPTION OF THE PREFERRED EMBODIMENTS

Figure 1:
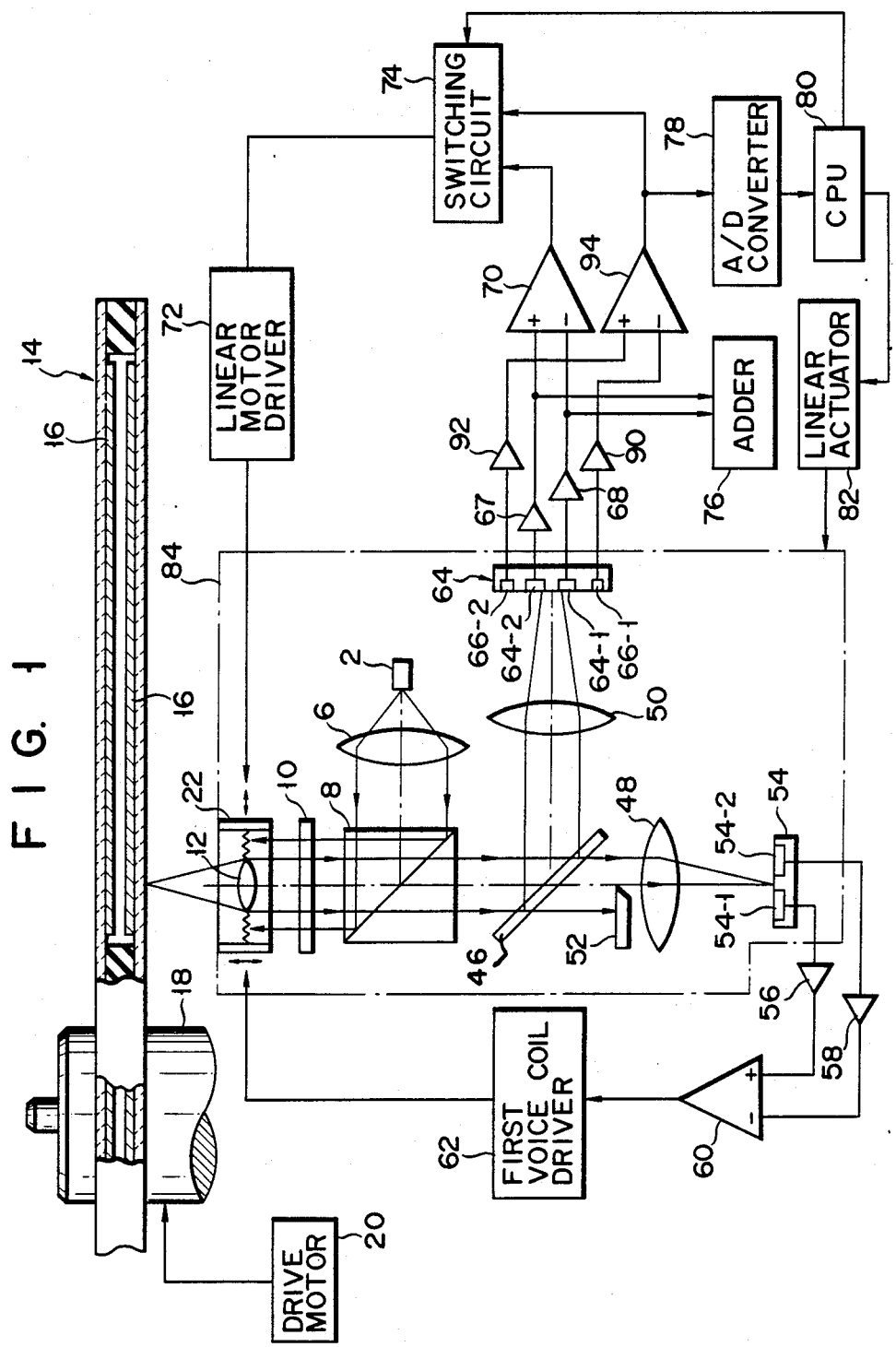
FIG. 1 is a block diagram showing an embodiment of an optical system for recording and reproducing information according to the present invention.

FIG. 1 shows an embodiment of an optical system and method for recording and reproducing information according to the present invention. In this system, a laser beam emitted from a laser unit 2 is collimated by a collimator lens 6 into a parallel light beam. The parallel light beam is reflected by a polarization beam splitter 8, and transmitted through a $\lambda/4$ plate 10 into an objective lens 12. This parallel light beam is converged by the lens 12 toward a light reflecting layer 16 of an optical disk 14. The disk 14 is placed on a turntable 18 rotated by a drive motor 20, and rotated together with the turntable 18. When the lens 12 is in a just-in-focusing state, the minimum beam spot corresponding to the beam waist of the converged light beam is formed on the light reflecting surface. When the lens 12 is in a defocusing state, a beam spot larger than the minimum beam spot corresponding to the beam waist of the converged light beam is formed on the light reflecting surface. A tracking guide is helically or concentrically formed on the light reflecting surface of the optical disk 14, preinformation such as a tracking address and a sector address is formed in advance as prepits on the tracking guide, and data information such as an image and so on is written as pits by the laser beam in the just-in-focusing state on the disk 14.

Figure 2:
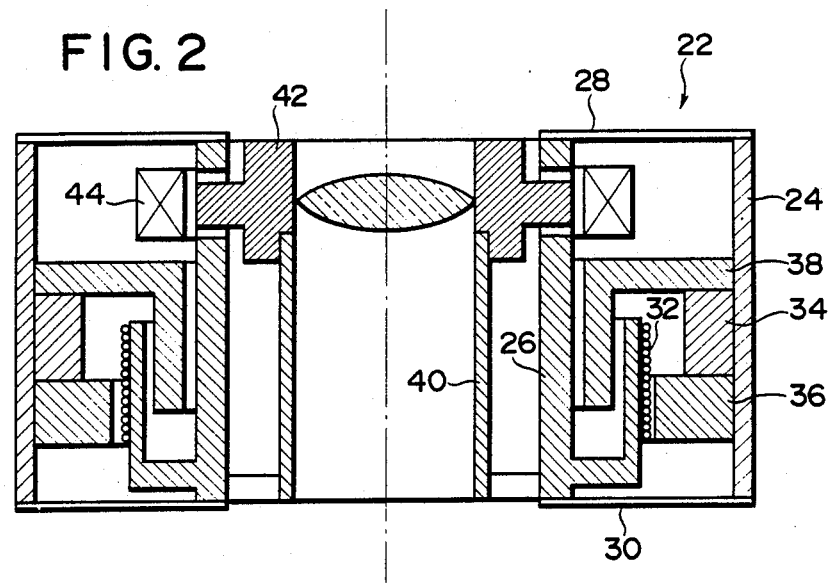
FIG. 2 is a sectional view showing a lens barrel for supporting an objective lens.

The objective lens 12 is supported, as shown in FIG. 2, by a lens barrel assembly 22 so that the objective lens can be finely moved in an optical axial direction of the lens 12 and in a direction perpendicular to the axial direction and to a direction perpendicular to the optical axis and that the tracking guide is extended. This assembly 22 has an outer cylinder 24 and an inner cylinder 26, and the inner cylinder 26 is capable of being moved in the direction of the optical axis in such a way that the end faces thereof are suspended by leaf spring members 28, 30 to the end faces of the outer cylinder 24. The cylinder 26 has a cup-shaped part extending from the lower end of the cylinder 26, and a voice coil 32 for a focus control is wound on the cup-shaped part of the cylinder 26. A permanent magnet 34 and yokes 36, 38 are formed on the inner surface of the cylinder 24. Thus, when the voice coil 32 is supplied with a current, the cylinder 28 moves along the optical axis depending upon the direction of the current. A leaf spring 40 is secured to the lower end of the cylinder 26, a lens holder 42 formed of a permanent magnet member is secured to the upper end of the spring 40, and the lens 12 is secured into the holder 42. A core frame (not shown) is provided on the outer periphery of the inner cylinder 26, and a coil 44 as a linear motor for a tracking control is wound on the core frame (not shown) opposite to the holder 42. Therefore, when the coil 44 is supplied with a current, the holder 42 is moved in a direction perpendicular to the optical axis, i.e., to the plane of the drawings, depending upon the direction of the current.

The laser beam reflected from the light reflecting layer 16 of the disk 14 is introduced again through the lens 12 and the λ/4 plate 10 to the splitter 8. When the laser beam returns through the plate 10, the polarized surface of the laser beam rotates. Thus, the laser beam returned to the splitter 8 is directed through the splitter 8 toward a half mirror 46. The laser beam is divided into two by the mirror 46, and directed toward projection lenses 48, 50. One laser beam is directed to the lens 48 disposed between the mirror 46 and the photodetector 54. A part of this laser beam is interrupted by a knife edge 52 inserted into the optical path in a direction perpendicular to the optical axis, and the remaining part is converged by the lens 48 toward a photodetector 54 for focus control. The photodetecting surface of the photodetector 54 is disposed substantially on an image forming plane on which an image of a beam spot is formed when the objective lens is in a just-in-focusing state. Therefore, the parallel laser beam is incident to the lens 48 and the converged laser beam is directed by the lens 48 toward the region between photosensitive regions 54-1 and 54-2, and signals of equal level are generated from the regions 54-1 and 54-2, when the objective lens 48 is in just-in-focusing state. On the other hand, the diverged or converted laser beam is incident to the lens 48 when in a defocusing state. The laser beam is directed by the lens 48 toward one of the regions 54-1, 54-2, and signals of different levels are generated from the regions 54-1, 54-2. The signals generated from the regions 54-1, 54-2 are respectively amplified by preamplifiers 56, 58, and supplied to a differential amplifier 60. Thus, a focusing signal of zero level is generated from the amplifier 60 when the objective lens 48 is in the just-in-focusing state, and a defocusing signal of plus or minus level or plus level is generated from the amplifier 60 when the objective lens 48 is in the defocusing state. Since a voice coil driver 62 supplies an energizing current to the voice coil 32 for a focus control in response to the signal generated from the amplifier 60, the lens 12 is allowed to remain in the just-in-focusing state by the voice coil 32, or to move from the defocusing state to the just-in-focusing state.

The other laser beam reflected from the mirror 46 is directed by the lens 50 to photodetector 64 for a tracking control. A beam spot is formed by the laser beam projected to the photodetecting surface of the photodetector 64, and a diffraction image of the tracking guide is produced as a dark part in the beam spot. When the laser beam directed from the lens 12 toward the light reflecting surface 16 is suitably tracing the tracking guide, the diffraction image of the tracking guide is symmetrically produced in the beam spot in respect to the center of the beam spot. On the other hand, when the laser beam erroneously traces the tracking guide, the diffraction image of the tracking guide is unsynmetrically produced in the beam spot, that is, the dark part is displaced from the center of the beam spot. Thus, light rays of equal intensity are incident on the photosensitive regions 64-1, 64-2 of the photodetector 64 for the tracking control, and signals of equal level are generated from the regions 64-1, 64-2 when tracking is proper. On the other hand, when the laser beam erroneously traces the tracking guide, light rays of different intensities are incident on the regions 64-1, 64-2 of the photodetectors 64, and signals of different levels are generated from the regions 64-1, 64-2. The signals generated from the regions 64-1, 64-2 are amplified by preamplifiers 67, 68 and supplied to a differential amplifier 70. Therefore, while the laser beam is suitably tracing the tracking guide, a tracking signal of zero level is generated from the amplifier 70, and while the laser beam erroneously traces the tracking guide, the tracking signal of plus or minus level is generated from the amplifier 70, and the signal is supplied through a switching circuit 74 to a linear motor driver 72. Since the driver 72 supplies the coil 44 with the energizing current in response to the signal generated from the amplifier 70, the lens 12 is allowed to remain in position by the coil 44, or moved to a direction perpendicular to the optical axis so that the laser beam suitably traces the tracking guide.

The signals amplified by the preamplifiers 67, 68 are added by an adder 76, the sum output is outputted as data information so that the data information is read out from the optical disk.

When an optical head 84 is, for example, moved from a predetermined position such as a home position to reproduce or record information from a desired tracking guide, a linear actuator 82 is actuated by an actuating signal from the CPU 80, and the head 84 is moved by the actuator 82 radially along the head 14 at a relatively fast speed. Since the lens 12 is suspended indirectly by the spring members 28, 30 at this time as described above, the lens 12 is vibrated at the moving of the head 84, i.e., displaced radially along the disk 14 in the assembly 22. Even if the lens 12 is displaced radially along the disk 14, the lens position or location is detected by the regions 66-1, 66-2 of the photodetector 64 as described below, and the lens 12 is so maintained that the optical axis of the optical system always coincides with that of the lens 12.

Figure 3A:
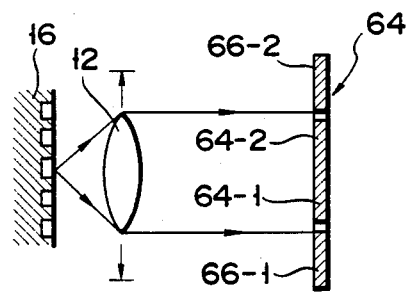
FIGS. 3A, 3B and 3C and FIGS. 4A, 4B and 4C are views showing orbits of a light beam in an optical system for detecting a position of an objective lens.
Figure 3B:
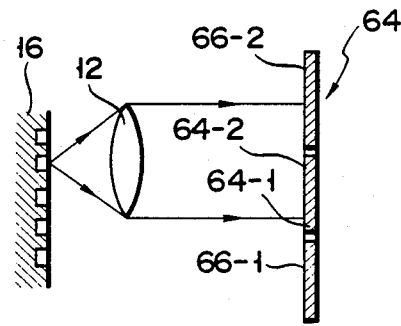
Figure 3C:
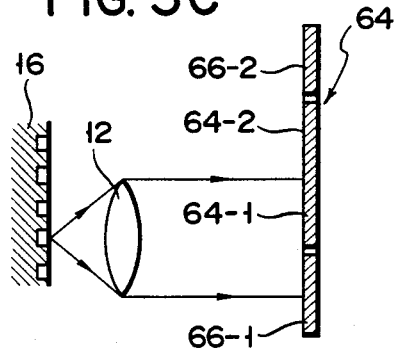

A system for detecting a parallel light beam returned through the lens 12 from the layer 16 in a just-in-focusing state will be described with reference to FIG. 2 for the simplicity of description. As apparent from FIG. 1, in the optical system as shown in FIG. 1, the diameter of the opening of the lens 12 is sufficiently smaller than that of the parallel light beam directed toward the layer 16, and the diameter of the beam is determined so that the lens 12 is capable of being transferred by the coil 44 in the beam. Thus, only the light beam passing through the lens 12 is directed toward the layer 16, and the parallel light beam emerging from the lens 12 has a diameter substantially equal to the diameter of the opening of the lens 12 as shown in FIGS. 3A to 3C. As shown in FIGS. 3A to 3C, the photodetector 64 is arranged on the region to which the beam is directed. As shown in FIG. 3A, the regions 64-1, 64-2 for detecting the signals are located in the optical path of the light beam when the optical axis of the lens 12 is aligned with that of the optical system, and the regions 66-1, 66-2 for detecting the position of the lens 12 are located out of the optical path. Therefore, as shown in FIG. 3A, when the optical axis of the lens 12 is aligned with that of the optical system, the light beam is incident only on the regions 64-1, 64-2 for detecting the signal, but not incident on the regions 66-1, 66-8 for detecting the position of the lens 12. Consequently, an output signal is not generated from the regions 66-1, 66-2. On the other hand, as shown in FIGS. 3B or 3C, when the head 84 is moved radially along the disk 14 at a relatively high speed so that the lens 12 is vibrated, i.e., displaced radially along the disk 14, the light beam is incident on not only the regions 64-1, 64-2 but any one of the regions 66-1, 66-2 for detecting the position of the lens 12. As a result, an output signal is generated from any of the regions 66-1, 66-2 The differential signal of both represents the displacement of the optical axis of the optical system from that of the lens 12.

As apparent from above, part of the regions 66-1, 66-2 for detecting the position of the lens 12 may be located in the optical path of the light beam when the optical axis of the lens 12 is aligned with that of the optical system. In this case, part of the light beam may be detected by the regions 66-1, 66-2.

Figure 4A:
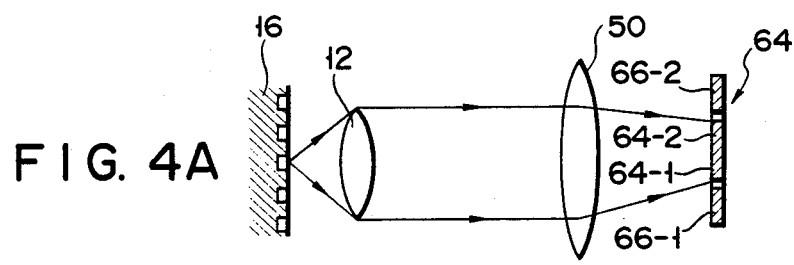
Figure 4B:
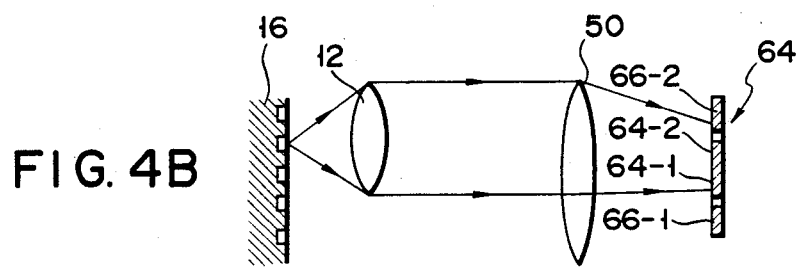
Figure 4C:
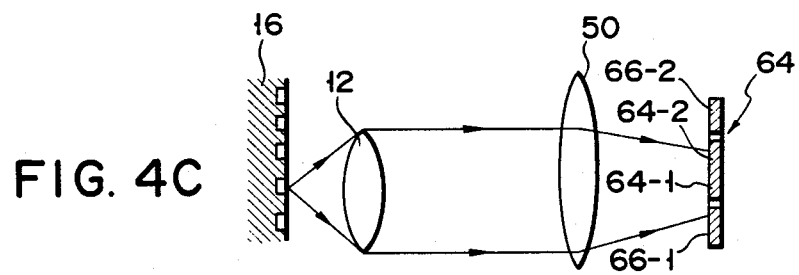

In the system shown in FIG. 1, the position of the lens 12 is detected by the regions 66-1, 66-2 in the same manner as described above. That is, when the optical axis of the lens 12 is aligned with that of the optical system as shown in FIG. 4A, the light beam is not incident on the regions 66-1, 66-2 for detecting the position of the lens 12. Thus, an output signal is not generated from the regions 66-1, 66-2. On the other hand, as shown in FIGS. 4B or 4C, when the head 84 is displaced, the light beam is incident on any of the regions 66-1, 66-2 for detecting the position of the lens 12. Thus, an output signal is generated from any one of the regions 66-1, 66-2. This signal is amplified by preamplifiers 90, 92, and supplied to a differential amplifier 94. Therefore, a position signal of plus or minus level is generated from the amplifier 94, and supplied through a switching circuit 74 to the second voice coil driver 72. Since the driver 72 supplies the coil 44 with the energizing current in response to the signal generated from the amplifier 94, the lens 12 is moved so that the optical axis of the lens 12 is aligned with that of the optical system. In other words, the vibration of the lens 12 is stopped.

In a system shown in FIG. 1, a switching signal is applied to the switching circuit 74 simultaneously when the actuating signal is generated from the actuator 82 from the CPU 80 in case the head 84 is moved, and the amplifier 94 for detecting the position of the lens 12 is connected through the switching circuit 74 to the linear motor driver 72. When the head 84 is stopped and the vibration of the lens 12 is stopped, an output signal is not generated from the regions 66-1, 66-2. Thus, an output signal is not generated from the amplifier 94. When the position signal of zero level is applied from the converter 78 to the CPU 80, the CPU 80 applies a switching signal to the switching circuit 74, the amplifier 94 is disconnected from the driver 72, and the amplifier 70 is connected through the switching circuit 74 to the driver 72. As a result, a tracking servo control is operated, and the laser beam suitably traces the tracking guide.

According to the present invention as described above, the position of the objective lens in the optical head can be optically detected, and the vibration of the lens can be reliably stopped even when the lens is vibrated in the head.

Figure 5:
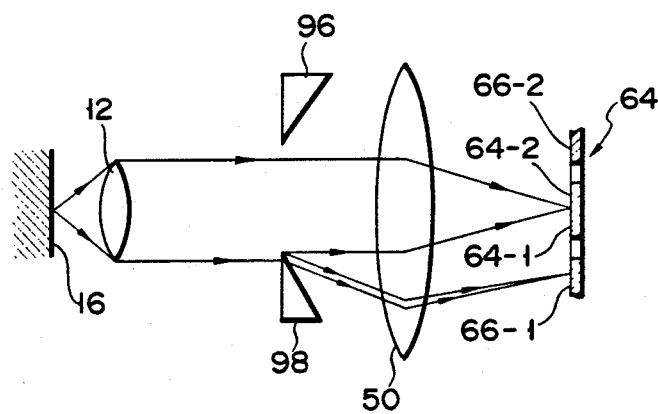
FIG. 5 is a schematic view of another embodiment of an optical system for detecting a position of an objective lens according to the present invention.

The present invention is not limited to the particular embodiments described above. Various other changes and modifications may be made within the scope of the present invention. For example, as shown in FIG. 5, prisms 96, 98 may be disposed out of the optical path of the light beam emerging from the objective lens 12 when the optical axis of the lens 12 is aligned with that of the optical system. In this embodiment, when the optical axis of the objective lens is aligned with that of the optical system, the light beam is incident on only the regions 66-1, 66-2 for detecting the position of the lens. On the other hand, when the head 84 is displaced, the light beam is partly incident on any of the prisms 96, 98, part of the light beam is deviated by any of the prisms 96, 98, and directed toward any of the regions 66-1, 66-2. As a result, the position of the lens 12 can be detected.

What is claimed is:

1. Apparatus for reducing vibration of an objective lens in an optical read/write system having a storage medium with a light reflecting surface having a tracking guide, comprising:
    a head assembly including:
        light source means for generating a light beam;
        objective lens means having an optical axis, adapted for converging the light beam onto said light reflecting surface tracing guide, and for transferring a light beam reflected from said light reflecting surface;
        means for moving said objective lens means in a direction parallel to said optical axis, and in a direction perpendicular to said optical axis; and
        photodetector means for receiving the transferred light beam and providing an error signal indicative of vibration of said objection lens means perpendicular to said optical axis;
    means for driving said optical head assembly in said direction perpendicular to said optical axis; and
    processing means for (a) receiving said error signal from said photodetector means, (b) controlling said means for moving to cause said objective lens means to move in said direction perpendicular to said optical axis to reduce vibration of said objective lens means in response to said error signal, and (c) controlling said means for driving to cause said optical head assembly to move in said perpendicular direction.

2. Apparatus according to claim 1 wherein said photodetector means includes at least first and second photosensitive regions disposed so that said transferred light beam is incident upon one of said photosensitive regions when said objective lens means is vibrating.

3. Apparatus according to claim 2 wherein said at least first and second photosensitive regions as disposed so that said, transferred light beam is incident upon neither said first nor second photosensitive regions when said objective lens means is not vibrating.

4. Apparatus according to claim 1 further including projection lens means, disposed on an optical path of said transferred light beam between said objective lens means and said photodetector means, for converging said transferred light beam.

5. Apparatus according to claim 4 wherein said photodetector means includes at least first and second photosensitive regions, and wherein said first and second photosensitive regions are disposed to cause the converged transferred light beam to be incident upon neither of said first and second photosensitive regions when said objective lens means is not vibrating.

6. Apparatus according to claim 1 wherein said photodetector means includes at least first and second photosensitive regions, each producing an output signal when detecting the transferred light beam, and wherein said processing means provides said error signal when there is a difference between the signals generated by said first and second photosensitive regions.

7. Apparatus according to claim 6 wherein said processing means includes means for (d) halting said means for moving said objective lens means when said optical head assembly is not moved by said means for driving.

8. Apparatus according to claim 1 further including means for coupling said photodetector means to said means for moving when said means for driving moves said optical head assembly, and for disconnecting said photodetector means from said means for moving when said means for driving no longer drives said optical head assembly.

9. Apparatus according to claim 1 further including means for movably supporting said objective lens.

10. Apparatus according to claim 9 wherein said means for movably supporting includes:
   means for moving objective lens along said optical axis; and
   means for moving said objective lens in said direction perpendicular to said optical axis.

11. Apparatus according to claim 9 wherein said means for moving said objective lens means along said optical axis includes a first coil, and wherein said means for moving said objective lens means in said direction perpendicular to said optical axis includes a second coil.

12. Apparatus according to claim 1 wherein said photodetector means includes third and fourth photosensitive regions for receiving the transferred light beam and providing data and tracking signals corresponding thereto.

13. Apparatus for reducing vibration of an objective lens in an optical read/write system having a storage medium with a light reflecting surface having a tracking guide, comprising:
   a head assembly including:
      light source means for generating a light beam;
      objective lens means having an optical axis, adapted for converging the light beam onto said reflecting surface, and for transferring a light beam reflected from said light reflecting surface;
      means for moving said objectives lens means in a direction parallel to said optical axis, and in a direction perpendicular to said optical axis;
      beam splitting means for splitting said transferred light beam into a focus portion and a data/tracking portion;
      focus photodetector means for receiving the focus portion of the transferred light beam and providing a focus signal when the converged light beam is not properly focused on said light reflecting surface, said focus signal being provided to said means for moving said objective lens means; and
      data/tracking photodetector means for receiving the data/tracking portion of the transferred light beam and providing a data signal corresponding to said data/tracking portion of said transferred light beam, and providing an error signal when the objective lens means is vibrating;
   means for driving said optical head assembly in said direction perpendicular to said optical axis; and
   processing means for (a) receiving said error signal from said data/tracking photodetector means, (b) controlling said means for moving said objective lens means to cause said objective lens means to move in said direction perpendicular to said optical axis in response to said error signal, thus reducing vibration of said objective lens means, and (c) controlling said means for driving to cause said optical head assembly to move in said perpendicular direction.

14. Apparatus according to claim 13 wherein said data/tracking photodetector means includes first, second, third, and fourth photosensitive regions, and wherein said data and tracking signals are provided from said second and third photosensitive regions, and wherein said error signal is provided from said first and fourth photosensitive regions.

15. Apparatus according to claim 13 wherein said means for moving said objective lens means includes:
   means having a first voice coil, for moving said objective lens means in said direction parallel to said optical axis; and
   means having a second voice coil, for moving said objective lens means in said direction perpendicular to said optical axis.

16. Apparatus according to claim 15 wherein said focus signal is provided from said focus photodetector means to said first voice coil of said means for moving said objective lens means.

17. A method for reducing vibration of an objective lens in an optical head assembly portio of an optical read/write system having a storage medium with a light reflecting surface having a tracking guide, comprising the steps of:
   generating a light beam;
   converging, with an objective lens, the light beam onto said light reflecting surface;
   transferring, with said objective lens, a light beam reflected from said light reflecting surface;
   splitting said transferred light beam into a data/tracking light beam and a focus light beam;
   receiving said data/tracking light beam with a data/tracking photodetector device, and providing an error signal when the objective lens is vibrating;
   receiving said focus light beam with a focus photodetector device, and providing a focus signal when said converged light beam is not properly focused on said tracking guide;
   moving said objective lens in a direction to the optical axis thereof in response to said focus signal;
   moving said objective lens means in a direction perpendicular to said optical axis in response to said error signal; and
   moving said optical head assembly a predetermined distance in said direction perpendicular to said optical axis.

18. A method according to claim 17 wherein said step of receiving said data/tracking light beam includes the step of receiving said data/tracking light beam with a data/tracking photodetector device having first, second, third, and fourth photosensitive regions, and wherein said error signal is produced by a difference in output signals of said first and fourth photosensitive regions, and wherein data and tracking signals are provided from output signals of said second and third photosensitive regions.

19. A method according to claim 17 wherein said step of receiving said focus light beam and includes the step of receiving said focus light beam with a focus detector device having first and second photosensitive regions and wherein said focus signal is produced by a difference in output signals of said first and second photosensitive regions.

20. A method according to claim 17 further including the steps of:
projecting, with a first projection lens, said data/tracking light beam onto said data/tracking photodetector device; and
projecting, with a second projecting lens, said focus light beam onto said focus photodetector device.

21. A method according to claim 17 including the further steps of:
determining when said optical head assembly is moved in said direction perpendicular to said optical axis; and
refraining from said steps of moving said objective lens means in said direction parallel and in said direction perpendicular to said optical axis when said optical head assembly is detected as not moving.

22. A method according to claim 17 wherein said step of splitting said transferred light beam includes the step of partially shielding a portion of said focus light beam after said transferred light beam has been split.

* * * * *